United States Patent [19]

Azuma et al.

[11] Patent Number: 5,323,273

[45] Date of Patent: Jun. 21, 1994

[54] AUDIO SIGNAL RECORDING AND PLAYBACK APPARATUS OF MAGNETIC RECORDING AND PLAYBACK APPARATUS

[75] Inventors: Nobuo Azuma, Yokohama; Takashi Furuhata, Kamakura; Yoshizumi Watatani, Fujisawa; Hiroaki Takahashi; Katsumi Takeda, both of Yokohama, all of Japan

[73] Assignee: Hitachi, Ltd., Tokyo, Japan

[21] Appl. No.: 738,470

[22] Filed: Jul. 31, 1991

[30] Foreign Application Priority Data

Aug. 10, 1990 [JP] Japan .................................. 2-210360

[51] Int. Cl.$^5$ .............................................. G11B 5/02
[52] U.S. Cl. .................... 360/19.1; 360/35.1; 369/86
[58] Field of Search ............... 360/19.1, 35.1; 369/86, 369/89; 358/343, 906

[56] References Cited

U.S. PATENT DOCUMENTS

| | | | |
|---|---|---|---|
| 4,583,132 | 4/1986 | Nakano et al. | 360/19.1 |
| 4,630,134 | 12/1986 | Kanamaru | 358/343 |
| 4,633,332 | 12/1986 | Higurashi et al. | 360/19.1 |
| 4,812,921 | 3/1989 | Mitsuhasi et al. | 358/343 |
| 4,847,698 | 7/1989 | Freeman | 358/343 |
| 4,849,831 | 7/1989 | Hino | 360/19.1 |
| 5,043,970 | 8/1991 | Holman | 369/89 |

*Primary Examiner*—David R. Hudspeth
*Assistant Examiner*—Jon Santamauro
*Attorney, Agent, or Firm*—Antonelli, Terry, Stout & Kraus

[57] ABSTRACT

An audio signal recording and playback apparatus of a magnetic recording and playback apparatus operates to record and play back multiple audio signals together with a video signal in first and second recording areas formed in correspondence to audio signals of first and second sets each consisting of two channels. Among input stereo audio signals in four channels at most, two-channel signals corresponding to left and right side information are recorded as main audio signals in the first recording area and remaining two-channel signals are recorded selectively as ancillary audio signals in the second record area.

15 Claims, 7 Drawing Sheets

AUDIO SIGNAL RECORDING AND PLAYBACK APPARATUS OF MAGNETIC RECORDING AND PLAYBACK APPARATUS

BACKGROUND OF THE INVENTION

This invention relates to a magnetic recording and playback apparatus operative to record and play back audio signals in multiple channels and a video signal, and particularly to a magnetic recording and playback apparatus capable of recording and playing back multiple audio signals in the high-definition television signal form.

Magnetic tape recording and playback apparatuses intended for home use, i.e., rotary head, helical-scan video tape recorders (VTRs), have been designed to meet the NTSC standard television signal form (or PAL or SECAM signal form in Europe). Recently, development and commercialization of HDTV (high definition television), which is also called "high vision", for reproducing higher quality pictures have begun. High-definition VTRs are divided into the analog recording system and digital recording system, as described in an article entitled "Special issue: Annual report on television, Section 4-2, HDTV (high vision)", in the publication of The Institute of Television Engineers of Japan, Vol. 42, No. 7, pp. 655-657, published in 1988. A specific example of analog high-definition VTRs is described in the Technical Report of the above institute, ppOE56-2, pp. 7-11, published on Nov. 28 1984, and a specific example of digital high-definition VTRs is described in an article entitled "Special issue: Recent magnetic and optical recording techniques, Section 5.1, Digital VTR" in the publication of the above institute, Vol. 42, No. 4, pp. 338-346, published in 1988.

In regard to audio signals in the high-definition television, or high vision, system, commercialization is under way for the system which provides enhanced sound realism by using four channels (left channel L, right channel R, center channel C, and rear channel S), as described in the publication of the above-mentioned institute, Vol. 44, No. 3, pp. 228-233. Accordingly, it is, desirable for high-definition VTRs to have the ability for recording and playing back audio signals in four channels.

Conventionally, in the case of an analog recording high-definition VTR, analog audio signals are recorded in two channels in the longitudinal direction of the magnetic tape, while in the case of a digital recording high-definition VTR, audio signals are recorded in eight channels in the longitudinal direction of the magnetic tape.

In a NTSC-based composite digital VTR ($D_2$-type VTR), although this is not a high-definition VTR, digital audio signals are recorded in four channels in the rotary head scanning direction in an area different from that of the video signal track.

SUMMARY OF THE INVENTION

The foregoing prior art involves the following problems.

(1) Conventional VTRs based on either analog recording or digital recording employ the same recording scheme for all audio channels (two to eight channels) without differentiating indispensabilities for respective audio channels, and therefore it lacks in such flexibility as reducing the number of channels when only part of audio channels is used.

(2) For the provision of "after recording" function, all audio channels need to be recorded in separate areas on the magnetic tape, and therefore it is not possible to superimpose each audio signal on the pertinent video track on a frequency division or time division basis with the intention of reducing the quantity of tape used.

The present invention is intended to overcome the above-mentioned two prior art problems, and its prime objective is to provide a magnetic recording and playback apparatus capable of reducing the quantity of magnetic tape used for audio signals so that long-term video recording is possible with a small-size cassette tape, while retaining the "after recording" function.

In order to achieve the above objective, the inventive apparatus operates to record audio signals based on weighting of four-channel HDTV audio signals depending on individual indispensability, and includes main signal recording and playback means for recording and reproducing main audio signals in two channels on the magnetic tape, and ancillary recording and playback means for recording and reproducing less indispensable, ancillary audio signals in two channels in an area different from the record area of the main signals, so that the ancillary signals can be rendered "after recording", at least when necessary. The audio signals of the four channels are labelled in a control signal, which is recorded in at least the ancillary signal record area, and the main signals can also be recorded by being superimposed on the video track when necessary.

In the above-mentioned arrangement, the two-channel main signals are recorded on a frequency division or time division basis by being superimposed on the video track when necessary, and the two-channel ancillary signals are recorded in an area different from that of the main signals on the magnetic tape. Since the ancillary signal area is an independent record area, such additional signals as narrations can be rendered "after recording", and the quantity of magnetic tape used to record audio signals can be reduced, as compared with the conventional apparatus, through superimposed recording of the main signals on the video track. In addition, owing to separate record areas for the main signals and ancillary signals, it is possible to design a VTR of the type in which only indispensable, main signals are recorded.

DESCRIPTION OF THE PREFERRED EMBODIMENT

Figure 3A:
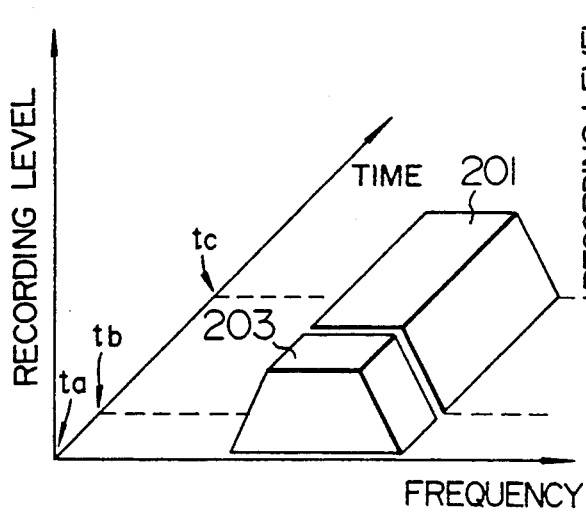
FIGS. 3A and 3B are frequency spectrum diagrams of recorded signals.
Figure 3B:
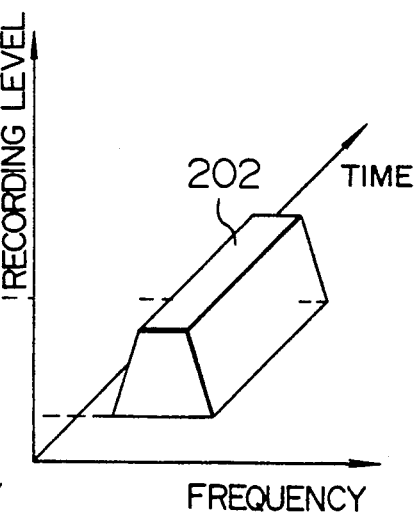
Figure 4:
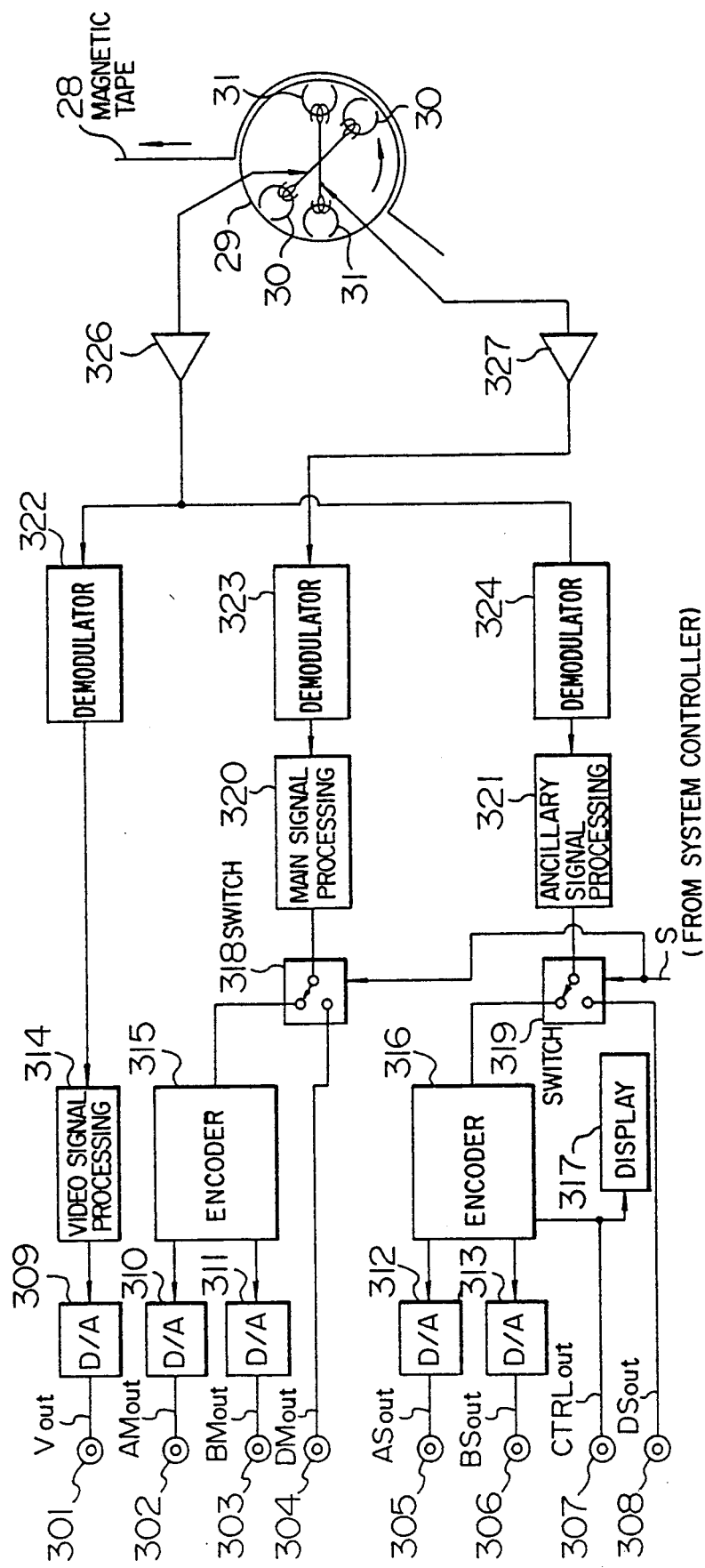
FIG. 4 is a block diagram used to explain the playback operation.

The audio signal recording and playback apparatus based on an embodiment of this invention will be described with reference to the block diagrams of FIG. 1 and FIG. 4, the tape record pattern diagram of FIG. 2, and the recorded signal spectrum diagram of FIG. 3.

Figure 1:
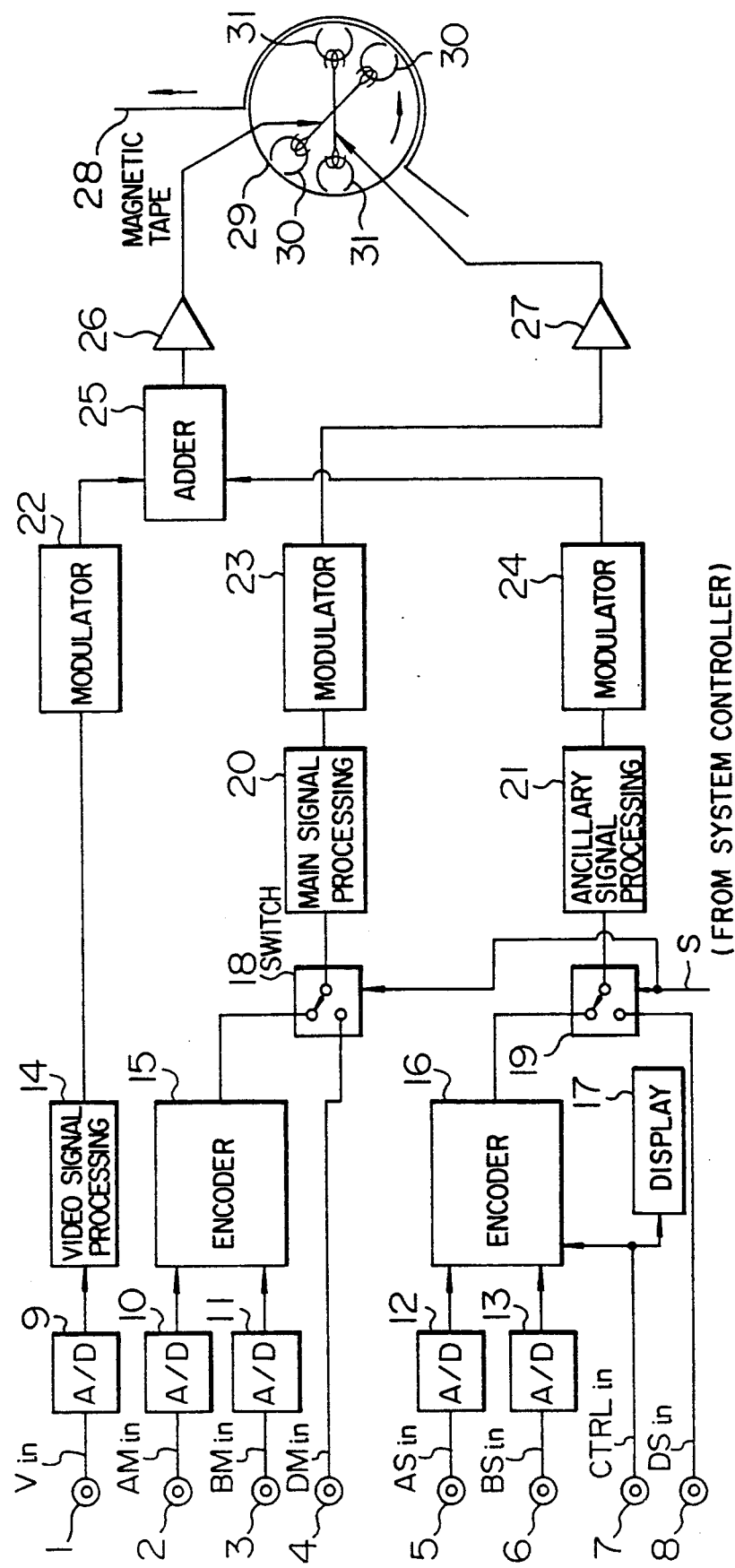
FIG. 1 is a block of the magnetic recording and playback apparatus based on an embodiment of this invention.

FIG. 1 is a block diagram used to explain the recording operation of the apparatus.

In the figure, reference 1 is an input terminal for a video signal Vin; 2 and 3 are input terminals for two-channel principal audio signals (main signals) AMin and BMin; 4 is an input terminal for a main signal DMin in a digital form for transferring the main signals AMin and BMin in a serial manner over a signal line; 5 and 6 are input terminals for two-channel ancillary audio signals ASin and BSin; 7 is an input terminal for a control signal CTRLin which represents the types of the audio signals AMin, BMin, ASin and BSin; 8 is an input terminal for an ancillary signal DSin in a digital form for transferring the ancillary audio signals ASin and BSin and the control signal CTRLin (these signals are called generically "ancillary signals") in a serial manner over a signal line; 9 through 13 are A/D converters for converting analog signals into digital signals; 14 is a video signal processing circuit which operates in unison with a modulator 22 to implement the signal processing adapted to both analog recording and digital recording on a magnetic tape; 15 is an encoder for encoding the main signals AMin and BMin (these are of the analog form of the base band in this embodiment) to have the same digital signal form as of the DMin signal; 16 is an encoder for encoding the signals ASin, BSin and CTRLin; 17 is an indicator for indicating the content of the control signal CTRLin (types of audio signals); 18 and 19 are switches which are operated by the command signal S issued by the system controller (not shown) of the inventive VTR; 20 is a main signal processing circuit which operates in unison with a modulator 23 to implement processing adapted to recording on the magnetic tape for the main signal DMin or signals produced by the encoder 15 (the processing circuit 20 implements error correction, etc. for digital recording of audio signals in this embodiment); 21 is an ancillary signal processing circuit which operates in unison with a modulator 24 to implement processing adapted to recording on the magnetic tape for the ancillary signal DSin or the signals produced by the encoder 16, 25 is an adder; 26 and 27 are recording amplifiers; 28 is a magnetic tape; 29 is a rotary drum; and 30 and 31 are rotary heads.

Figure 2:
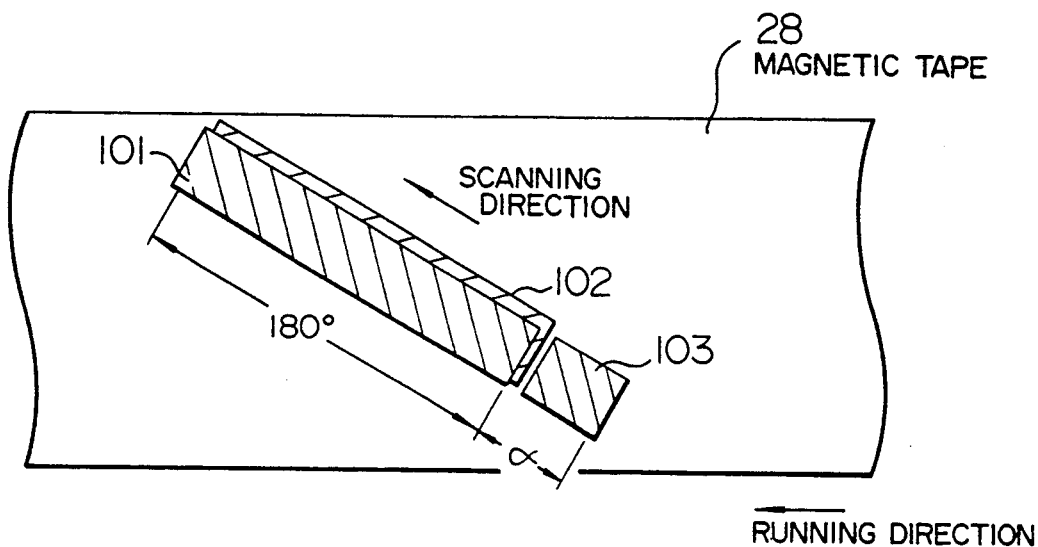
FIG. 2 is a diagram showing patterns of record on the magnetic tape.

FIG. 2 is a diagram showing record patterns on the magnetic tape 28. The video signal and the ancillary signals including the ASin, BSin and CTRLin signals are fed through the adder 25, recording amplifier 26 and rotary head 30, and recorded in a record area (video track) 101 and an ancillary signal record area (ancillary signal track) 103, respectively, on the magnetic tape 28. In the case of analog recording for the video signal, the area 101 is preferably a 180° record area, and therefore the wrap angle is set to be 180°+α so that the ancillary signals are recorded in the overlap section α. In this case, the ancillary signals are recorded in the area 103, and next the video signal is recorded in the area 101. Since signals are recorded in the areas (on a track) 101 and 103 with the same rotary head, they have the same azimuth angle.

The embodiment explained below is the case where the main signals (including the AMin and BMin) are recorded digitally in a deep zone of the video track by being rendered frequency divided and PCM coded, i.e., recorded by superimposition on the video track. The main signals are recorded by way of the recording amplifier 27 and rotary head 31 in a main signal record area which is located in a deep zone 102 of the video track 101 as shown in FIG. 2. For the prevention of mixed modulation of the video signal and the main signals, these signals are recorded with different recording azimuths and different recording frequency bands as shown in the spectral diagrams of FIGS. 3A and 3B. FIG. 3A is a frequency spectrum diagram for the rotary head 30, by which the ancillary signals are recorded to have a spectrum 203 for a duration from $t_a$ to $t_b$ in an ancillary signal record area 103 in FIG. 2, and thereafter the video signal is recorded to have a spectrum 201 for a duration from $t_a$ to $t_c$ in the area 101. FIG. 3B is a frequency spectrum diagram for the rotary head 31, by which the main signals are recorded to have a spectrum 202, which is a lower frequency band than 201, for a duration from $t_b$ to $t_c$ in a main signal record area 102 in a deep zone of the video track 101. For the prevention of mixed modulation, a high frequency bias signal may be recorded in the area 102 when necessary.

Since the ancillary signals are recorded in the area different from that of the main signals as mentioned above, these ASin, BSin and CTRLin signals can be rerecorded arbitrarily by "after recording". For example, when it is intended to replace, only the recorded signal Asin, the BSin and CTRL in recorded signals are read out with the rotary heads 30 in every revolution of the rotary head and stored together with a new recorded signal Asin in a buffer memory (not shown), and the contents of the buffer memory are recorded in the area 103 in each subsequent revolution of the head. During the "after recording" operation, the recording current to the rotary heads 31 is cut off.

Next, the playback operation will be explained with reference to the block diagram of FIG. 4. Portions identical to those of FIG. 1 are referred to by the common symbols.

In the figure, references 301-308 are output terminals provided in correspondence to the input terminals of FIG. 1, e.g., Vout corresponds to Vin, and AMout and BMout correspond to AMin and BMin; 309-313 are D/A converters for converting digital signals to analog signals; 314 is a video signal processing circuit which operates in unison with a demodulation circuit 322 to restore the original video signal from the signal picked up by the rotary head 30 and fed through a pre-amplifier 326; 320 is a main signal processing circuit which operates in unison with a demodulation circuit 323 to implement error correction and decoding for the signal picked up by the rotary head 31 and fed through a preamplifier 327 so that the same digital signal form as of DMin and DMout is restored; 321 is an ancillary signal processing circuit which operates in unison with a demodulation circuit 324 to restore the original signal form; 318 and 319 are switches operated by the command signal S; and 315 and 316 are decoders for restoring the AMout, BMout, ASout and CTRLout signals from the signals in the signal form of DMout and DSout (outputs of 320 and 321).

The playback operation is as follows. Record signals from the rotary head 30 are partially processed by 326, 322, 314 and 309 to reproduce the video signal Vout on the output terminal 301, and remaining portions of the signals from the ancillary signal record area are processed by 326, 324, 321, 319, 316, 312 and 313 to reproduce the ancillary signals ASout, BSout and CTRLout (or DSout), on the output terminals 305-308, respectively. Recorded signals from the rotary head 31 retrieved from the deep zone of the video track are processed by 327, 323, 320, 318, 315, 310 and 311 to reproduce the main signals AMout, BMout (or DMout) on the output terminals 302, 303 and 304, respectively.

Since the main signals are indispensable audio information (usually, AMin and BMin carry the left and right side sounds of stereo audio information, as will be mentioned later), it is possible for a simplified high-definition VTR to be designed such that the overlap section (section of angle $\alpha$) in FIG. 2 is absent, i.e., only two-channel main signals are recorded. Even in this case, the two-channel recording VTR has a minimal compatability (for the two-channel main signals to achieve the conventional stereo audio function) with the four-channel fully equipped VTR.

Figure 5:
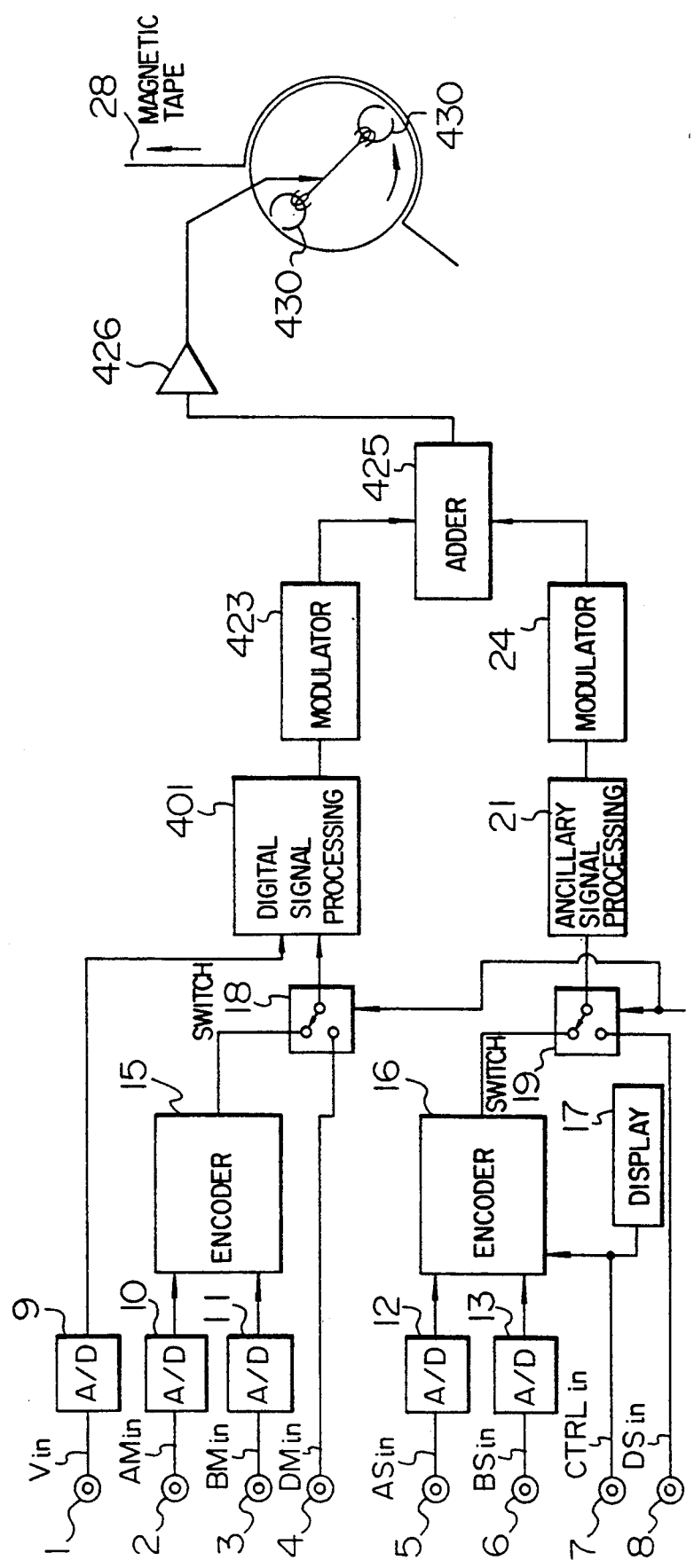
FIG. 5 is a block diagram showing another embodiment of this invention.

Next, PCM digital recording for the main signals on the video track based on time division will be described as the second embodiment of this invention with reference to the block diagram of FIG. 5 for the recording mode and the record pattern diagram of FIG. 6.

Figure 6:
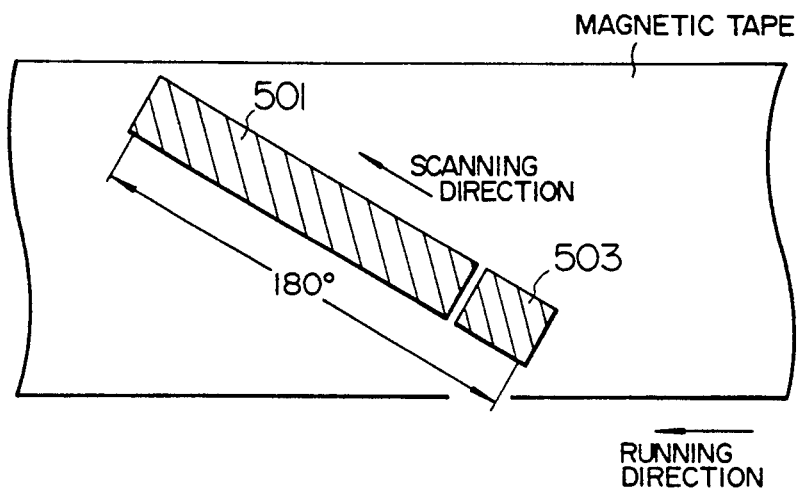
FIG. 6 is a diagram showing patterns of record on the magnetic tape based on the embodiment of FIG. 5.

The video signal Vin and the main signals (one of the output of encoder 15 and the DMin selected by a switch 18 in response to the command signal S) are merged and rendered such digital signal processing as error correction and coding by 401, and thereafter modulated by 423, fed through an adder 425 and recording amplifier 426, and recorded by a rotary head 430 in a record area 501 shown in FIG. 6. The ancillary signals are recorded in an ancillary signal record area 503 in the same manner as the embodiment of FIG. 1. Both the video signal and main signals are rendered PCM digital recording which does not take up a 180° strip, and therefore a 180° strip is formed to include the area 503 as shown in FIG. 6.

Next, the third embodiment of this invention which features a reduced overlap section for the ancillary signal area, presenting a unique effectiveness, will be described. This is a special case derived from the embodiment of FIG. 1.

Figure 7:
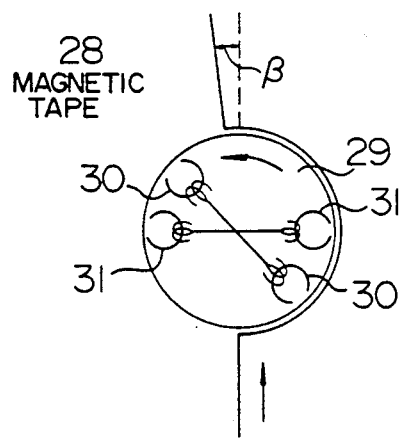
FIG. 7 is a diagram used to explain the rotary drum based on an embodiment of this invention.
Figure 8:
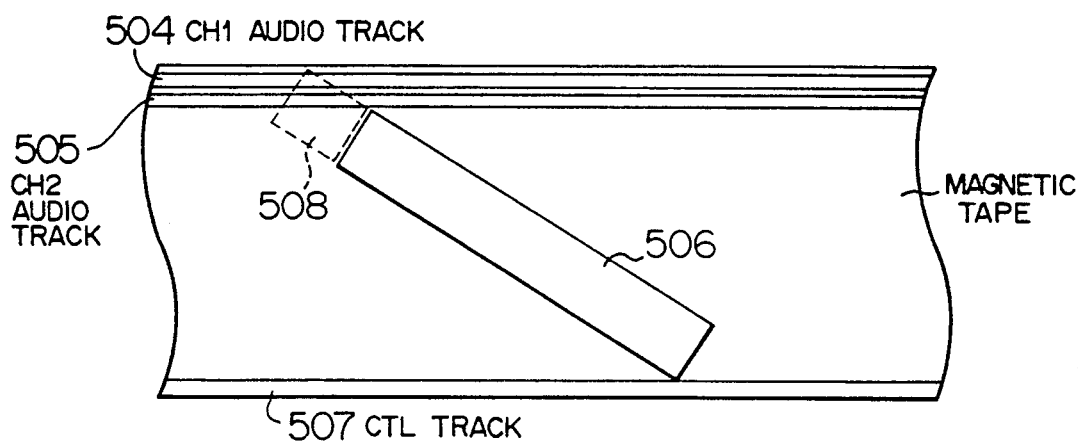
FIG. 8 is a diagram showing patterns of record on the magnetic tape in VHS mode.

FIG. 7 shows a rotary drum based on this embodiment. A VHS-mode VTR operates with a recording tape on which two-channel longitudinal audio tracks are formed along one edge of the tape. For the high-definition VTR which takes four audio channels, the wrap angle is increased by $\beta$ as shown in FIG. 7 and the longitudinal audio tracks of VHS are made the overlap section for the ancillary audio area in FIG. 2. The details will be explained on the record pattern diagram of VHS in FIG. 8. Shown by the solid line in FIG. 8 are record patterns of VHS, which include longitudinal audio tracks 504 and 505, a video track 506, and a tracking control signal (CTL, which is different from the foregoing audio control signal) track 507. The unused longitudinal audio tracks 504 and 505 are taken by an overlap area 508 shown by the dashed line, and is subsequently used for the ancillary audio signal area.

This arrangement with the addition of wrap angle by $\beta$ (also applied to the skew angle of the rotary drum) to the mechanism of VHS enables recording of high-definition video and audio signals, while retaining the compatibility with VHS-mode recording of NTSC signals (the recording/playback circuits are different). Areas 506 and 508 are used in high-definition mode, and areas 506, 504 and 505 are used in VHS mode.

Although the foregoing embodiments are designed to record the main signals in the video signal record area by superimposition, it is also possible to record the main signals in an area provided independently of the video signal area, as for the ancillary signals, if "after recording" is also needed for the main signals. Although the control signal is recorded in the ancillary signal record area in these embodiments, the signal may be recorded in the main signal record area or in both of the main and ancillary signal record areas when necessary. This scheme is particularly useful for a VTR which can record only two-channel main signals.

Next, recording of four-channel audio signals under control of the control signal (CTRL signal) will be explained in detail.

Figure 9:
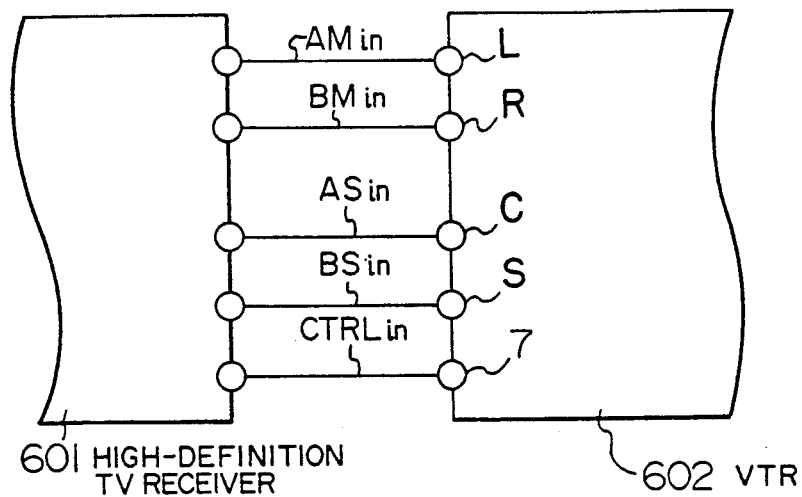
FIG. 9 is a diagram used to explain the connection with a high-definition television receiver.

FIG. 9 shows the connection for the audio system of the inventive VTR 602 with a high-definition television receiver 601 (incorporating a tuner and MUSE decoder on assumption of the MUSE broadcasting). The audio signals AMin, BMin, ASin and BSin received from the receiver 601 are of the left channel L, right channel R, center channel C and rear channel S, respectively, before selection. The control signal CTRLin is a serial or parallel digital signal (or it may be an analog signal which can express modes in terms of the signal level). These signals may have a form of base-band analog signal or a form of digital signals DMin and DSin for interfacing. The foregoing embodiments use "digital audio interface" stated in EIAJ standard CP-340 which is prevalent as the digital interface for CD players and the like.

Figure 10:
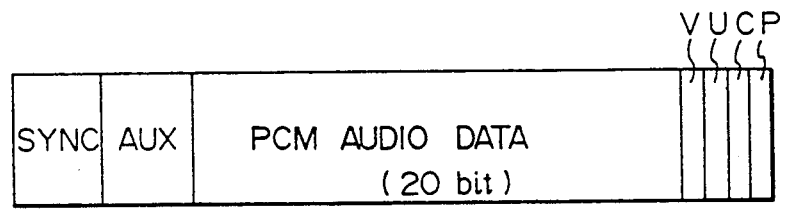
FIG. 10 is a diagram used to explain the digital input/output interface for the audio signals.

FIG. 10 shows the bit assignment of ancillary subframe based on the standard format of serial signal transfer. The 32-bit ancillary subframe consists of a 4-bit SYNC field, a 4-bit AUX field used for auxiliary information, a 20-bit PCM audio data field (used for the L channel or R channel), a parity flag bit V, a user bit U, a channel status bit C, and a parity bit P. For interfacing the control signal CTRLin (it is included in the ancillary signal in the embodiment of FIG. 1), the AUX bits or user bit U in FIG. 10 is used.

Figure 11:
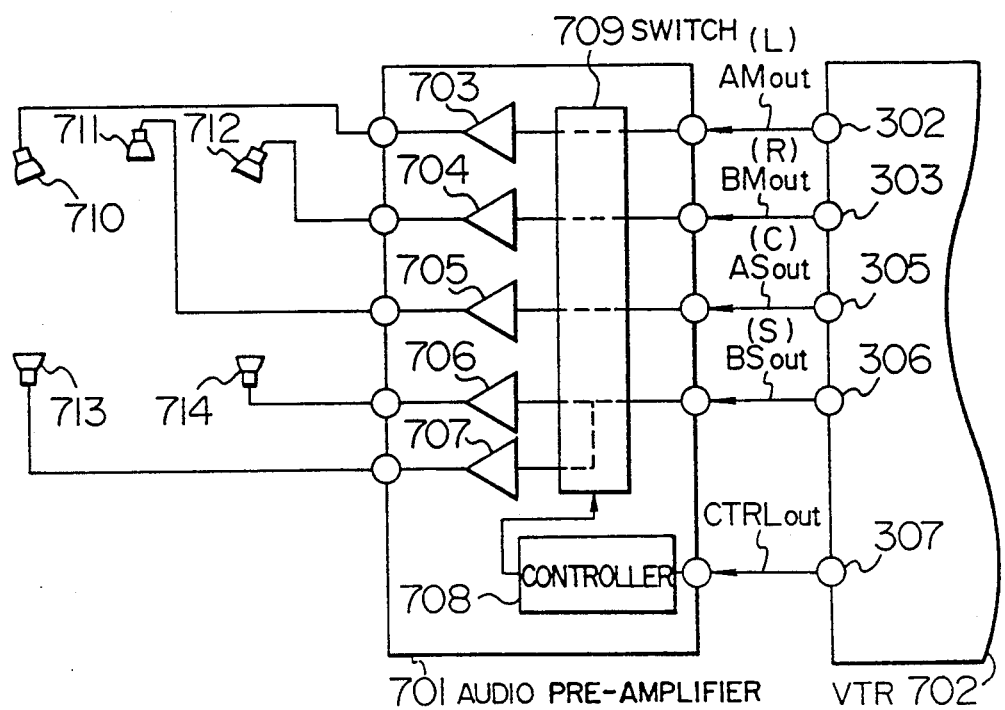
FIG. 11, FIG. 12 and FIG. 13 are diagrams used to explain the playback operation in which four-channel audio signals of different types are treated individually.

FIG. 11 is a diagram used to explain the playback operation through a pre-amplifier 701 and speakers 710-714 for the signals recorded in the inventive VTR 702 in the 3-1 mode (it uses the L,R,C and S channels as indicated by the CTRL signal) among the 3-1, 2-2, bilingual modes, etc. of the HDTV audio signal. The speakers 710-714 are placed on the left side, center, right side, rear left corner and rear right corner, respectively. References 703-707 are amplifiers which drive the respective speakers, and 708 is a controller which receives the CTRLout signal to produce the signal for controlling the switch 709. The four-channel audio signals recorded in the 3-1 mode are reproduced as AMout, BMout, ASout and BSout by the VTR 702 for the L, R, C and S channel sounds, respectively, and CTRLout includes information indicative of the 3-1 mode. The controller 708 identifies the signal transfer mode and operates on the switch 709 to make the connection shown by the dashed line so that the L, C, R, S and S channels are played back (formal 3-1 mode playback) on the speakers 710-714, respectively.

Figure 12:
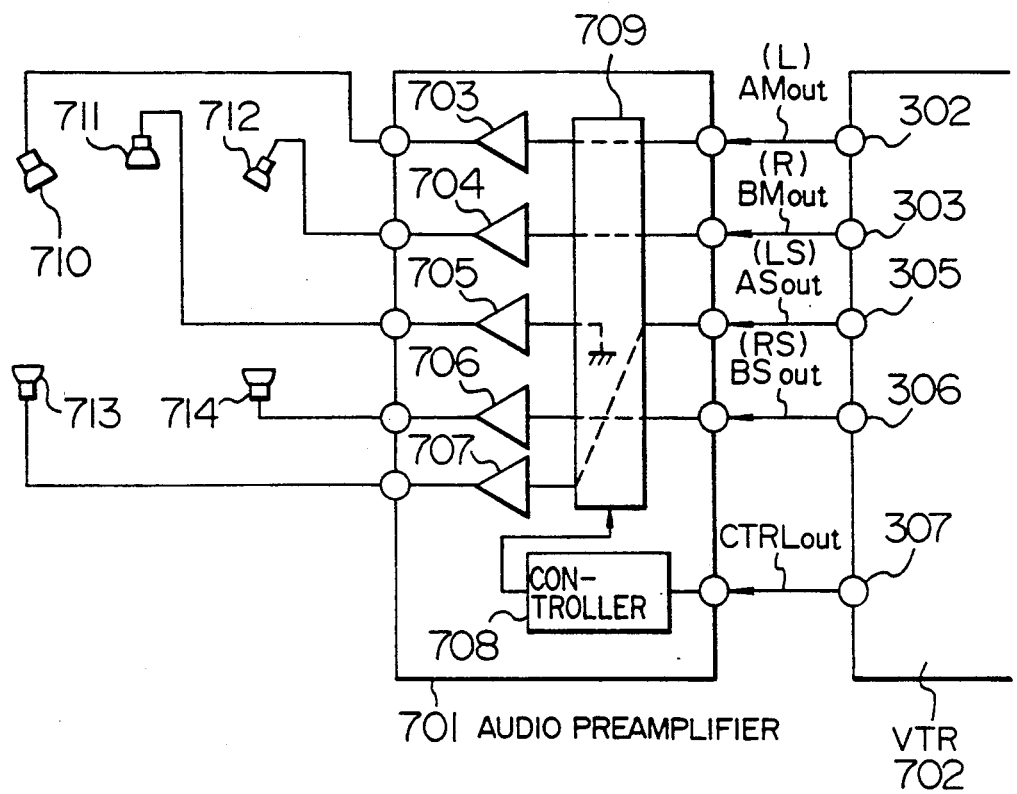

Next, the playback operation for the audio signals recorded in the 2-2 mode will be explained with reference to FIG. 12. This arrangement differs from FIG. 11 only in the state of the switch 709. The four-channel audio signals recorded in the 2-2 mode are reproduced as AMout, BMout, ASout and BSout by the VTR 702 for the L, R, LS (rear left corner) and RS (rear right corner) channel sounds, respectively, and the CTRLout signal includes information indicative of the 2-2 mode. The controller 708 identifies the mode and operates the switch 709 to alter the connection as shown by the dashed line in FIG. 12, so that the speakers 710-714 produce the L, none, R, LS and RS channel sounds (2-2 mode playback). Records in the bilingual mode (e.g., the S channel is assigned to a foreign language) can be treated in the same manner.

Next, an embodiment for recording signals from the television receiver 601 by processing the signals in the VTR 802, when necessary, will be described with reference to FIG. 13. References by 802-807 are input terminals, and input signal conversion circuits 808 and 809 are provided in the front stage of the VTR 802. The following explanation is the case where the L, R, C, S and CTRLin signals in the 3-1 mode are applied to the input terminals 802-807. The L and R signals in the 3-1 mode are different slightly from the left and right channel signals of the conventional stereo audio system. The 3-1 mode signals L and R are converted to the conventional left and right channel signals L' and R' as follows: $L' = L + 0.7C + 0.7S$ and $R' = L + 0.7C + 0.7S$. In response to the command signal S, the circuit 808 produces L' and R' from L, R, C and S, and these converted signals are recorded as AMin' and BMin' in the main signal area. The C and S signals are also used intact as the ASin' and BSin', and the CTRLin signal is added by information indicative of being converted by 809 (with information indicative of the 3-1 mode originally being retained), and these signals are recorded in the ancillary signal area. This embodiment is particularly useful for a VTR which can record only two-channel main signals. The two-channel recording VTR retains its format except for the ancillary signal area. The control signal is recorded preferably in both the main signal area and ancillary signal area. The playback operation yields the usual stereo effect (without rendering a feeling of center void).

Figure 13:
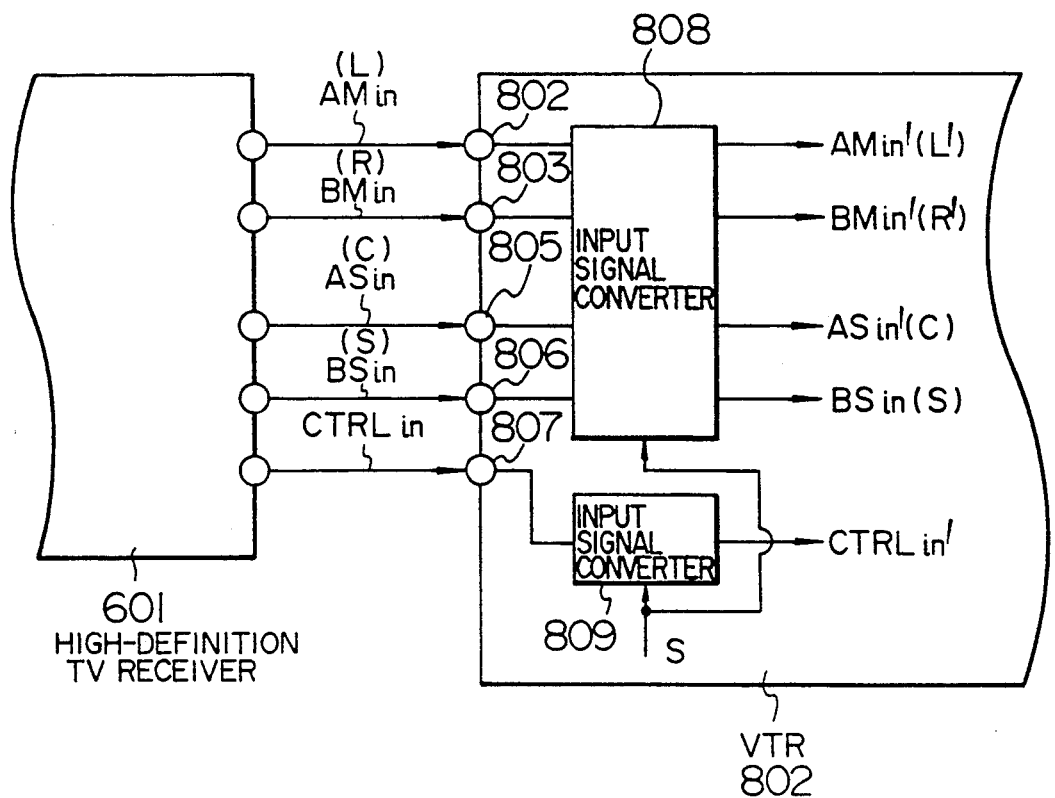

For a VTR with the ability of four-channel recording, as shown in FIG. 13, having four-channel records as a result of conversion from L and R to L' and R' and with the intention of playback in the 3-1 mode speaker system, the converted information is left in the control signal, and therefore the records can be played back in the formal 3-1 mode through another conversion of the signals. An advantage of recording through conversion of L and R to L' and R' is the recording of sounds with automatic provision of a normal stereo feeling in dubbing records from a VTR with the ability of four-channel recording to a VTR for two-channel recording.

In the case of recording on the inventive VTR the four-channel audio signals of MUSE broadcasting in A mode transmitted by being compressed, the compressed four-channel signal can be recorded in either a main signal area or an ancillary signal area through a signal line of the above-mentioned digital audio interface. The four-channel audio signal is entered to the VTR through the terminal 4 or 8 in FIG. 1. The unused recording area (for two channels) can be used as an "after recording" area.

As described above, this invention is designed to record four-channel HDTV audio signals by recording two channels of main signals and remaining two channels of ancillary signals in separate recording areas, with the main signals being recorded by superimposition on the video track, whereby the quantity of magnetic tape used for the audio signals can be reduced. The separate ancillary signal area can be used for "after recording". Recording of the control signal enables useful recording and playback of four-channel audio signals by discriminating the type of audio signals.

This invention can be practiced in other forms than the foregoing embodiments without departing from the spirit and major features of the invention. Namely, the foregoing embodiments are merely illustrations of the invention in all aspects, and it should not be reckoned in a definite sense. The scope of this invention is defined in the following paragraph of claims. Modifications and alterations of the invention within the scope of the claims are all covered in the scope of this invention.

We claim:

1. An audio signal recording and playback apparatus of a magnetic recording and playback apparatus operative to record and play back, together with a video signal, audio signals in multiple channels in first and second recording areas, said apparatus comprising:

audio signal input means for receiving stereo audio signals in four channels at most, having attributes in said video signal and for receiving a control signal including information regarding said channels having received said stereo audio signals;

main audio signal recording means for recording, as main audio signals having attributes in said video signal, said received stereo audio signals comprising at least two channels and being pertinent to left side audio information (L) and right side audio information (R) in said first recording area; and ancillary audio signal recording means for recording, as ancillary audio signals, signals comprising at least two channels of said received stereo audio signals in said second recording area only if said remaining audio signals are determined to be recorded;

wherein said control signal is recorded in said audio signal input means together with at least one of said main audio signals and ancillary audio signals, wherein said main audio signal recording means and said ancillary audio signal recording means, corresponding to said first and second recording areas respectively, are formed on each of skew tracks arranged in parallel on a magnetic tape, and wherein, further, said main audio signals and said ancillary audio signals are recorded on different areas, corresponding to said first and second recording areas respectively, on each of said skew tracks arranged in parallel on said magnetic tape.

2. An audio signal recording and playback apparatus according to claim 1, wherein said main audio signal recording means comprises main audio signal generation means for generating signals of at least two channels corresponding to left side audio information (L') and right side audio information (R') in four channels at most through cross-channel conversion for said received stereo audio signals, said generated main audio signals being recorded in said first recording area.

3. An audio signal recording and playback apparatus according to claim 2, wherein said main audio signal recording means comprises means for recording, together with said main audio signals, a signal corresponding to said control signal, said signal including information on the channel of said generated main audio signals.

4. An audio signal recording and playback apparatus according to claim 2, wherein said ancillary audio signal recording means comprises means for recording selectively audio signals of remaining channels out of said converted audio signals in said second recording area.

5. An audio signal recording and playback apparatus according to claim 1, wherein said main audio signal recording means comprises means for recording a signal, which is independent of the signals recorded,, in said first recording area, in said first recording area in an "after recording" mode.

6. An audio signal recording and playback apparatus according to claim 1, wherein said ancillary audio signal recording means comprises means for recording a signal which is independent of the signals recorded in said second recording area, in said second recording area in an "after recording" mode.

7. An audio signal recording and playback apparatus of a magnetic recording and playback apparatus operative to record and play back, together with a video signal, audio signals in multiple channels in first and second recording areas, said apparatus comprising:
audio signal input means for receiving stereo audio signals in four channels at most, having attributes in said video signal and for receiving a control signal including information regarding said channels having received said stereo audio signals;
wherein said audio signal input means comprises:
analog input means for entering analog stereo audio signals in four channels at most through corresponding four connection lines,
digital input means for entering digital stereo audio signals in four channels at most in a digital serial transfer mode, and
selection means for selecting one of the audio signals from said analog input means and audio signals from said digital input means, selected audio signals in four channels at most being recorded in at least one of said first and second recording areas;
main audio signal recording means for recording, as main audio signals having attributes in said video signal, said received stereo audio signals comprising at least two channels pertinent to left side audio information (L) and right side audio information (R) in said first recording area; and
ancillary audio signal recording means for recording, as ancillary audio signals, signals comprising at least two channels out of said received stereo audio signals in said second recording area only if said remaining audio signals are determined to be recorded;
wherein said control signal is recorded in said audio signal input means together with at least one of said main audio signals and ancillary audio signals,
wherein said main audio signal recording means and said ancillary audio signal recording means, corresponding to said first and second recording areas respectively, are formed on each of skew tracks arranged in parallel on a magnetic tape, and
wherein, further, said main audio signals and said ancillary signal are recorded on different areas, corresponding to said first and second recording areas respectively, on each of said skew tracks arranged in parallel on said magnetic tape.

8. An audio ,signal recording and playback apparatus according to claim 7, wherein said digital input means enters audio signals of two sets at most, each comprised of at least two channels, in digital serial transfer mode in two modes at most corresponding to said audio signal sets.

9. An audio signal recording and playback apparatus according to claim 7, wherein said digital input means comprises means for entering a control signal which includes information on the channel of the entered audio signals.

10. An audio signal recording and playback apparatus according to claim 9, wherein said digital input means uses the CP340 interface of digital audio interface for the serial transfer mode, and wherein said control signal is included by multiplexing in the AUX section, or user bit section of auxiliary information of the CP340 interface.

11. An audio signal recording and playback apparatus of a magnetic recording and playback apparatus having audio signal input means for receiving stereo audio signals in at most four channels having attributes in a video signal and for receiving a control signal containing information on the channels of said received stereo audio signals, said audio signal recording and playback apparatus being operative to play back stereo audio signals in four channels at most having attributes in video signal in a first and second recording areas, being independently disposed therein, wherein a set of main audio signals comprising at least two channels corresponding to left side audio information (L') and right audio information (R') of four channels at most derived from said received stereo audio signals through said cross-channel conversion thereof are recorded by a main audio signal recording means in said first recording area, a set of ancillary audio signals comprising at least two channels are recorded by an ancillary signal recording means in said second recording area, and a control signal which includes information on the channels of said stereo audio signals is recorded together with at least one of said set of main audio signals and said set of ancillary audio signals, said apparatus comprising:
means for retrieving said set of main audio signals from said first recording area;
means for retrieving said set of ancillary audio signals from said second recording area; and
means for restoring the original stereo audio signals in four channels at most from said retrieved sets of main and ancillary audio signals in accordance with said control signal retrieved together with said sets of main audio signals or ancillary audio signals;
wherein said main audio signal recording means and said ancillary audio signal recording means, corresponding to said first and second recording areas respectively, are formed on each of skew tracks arranged in parallel on a magnetic tape, and
wherein, further, said main audio signals and said ancillary signals are recorded on different areas, corresponding to said first and second recording areas respectively, on each of said skew tracks arranged in parallel on said magnetic tape.

12. A magnetic recording and playback apparatus according to claim 1, wherein said main audio signal recording means comprises means for recording said main audio signals together with said video signal on a time division basis in said first recording area.

13. An audio signal recording and playback apparatus of a magnetic recording and playback apparatus having audio signal input means for receiving stereo audio signals in at most four channels having attributes in a video signal and for receiving a control signal containing information on the channels of said received stereo audio signals and said audio signal recording and playback apparatus being operative to play back a magnetic tape which has such a tape pattern that first and second recording areas, being independently disposed therein, wherein a set of main audio signals comprising at least two channels corresponding to left side audio information (L') and right audio information (R') included in at most four channels signals produced through cross-channel converting said at most four-channel stereo audio signals have been recorded by a main audio signal recording means in said first recording area, while a set of ancillary audio signals comprising at least two channels in said cross-channel converted at most four-channel signals have been recorded by an ancillary signal recording means in said second recording area, and a control signal containing information on the channels of said received at most four-channel stereo audio signals is recorded together with at least one of said set of main audio signals and said set of ancillary audio signals, said audio signal recording and playback apparatus comprising:
    means for retrieving said set of main audio signals from said first recording area;
    means for retrieving said set of ancillary audio signals from said second recording area; and
    means for restoring said original stereo audio signals in four channels at most from said retrieved sets of main and ancillary audio signals in accordance with said control signal retrieved together with said sets of main audio signals or ancillary audio signals;
    wherein said main audio signal recording means and said ancillary audio signal recording means, corresponding to said first and second recording areas respectively, are formed on each of skew tracks arranged in parallel on a magnetic tape, and
    wherein, further, said main audio signals and said ancillary signals are recorded on different areas, corresponding to said first and second recording areas respectively, on each of said skew tracks arranged in parallel on said magnetic tape.

14. An audio signal recording and playback apparatus of magnetic recording and playback apparatus operative to record and play back, together with a video signal, audio signals in multiple channels in first and second record areas, being independently disposed therein, wherein the audio signal recording and playback apparatus of a first magnetic recording and playback apparatus of the group comprises:
    audio signal input means for receiving stereo audio signals in at most four channels having attributes in said video signals and a control signal containing information on the channels of said received stereo audio signals;
    main audio signal recording means for generating, as main audio signals having attributes in said video signal, signals comprising at least two channels to left side audio information (L') and right side audio information (R') included in signals of at most four channels derived through cross-channel converting said received stereo audio signals and for recording said generated main audio signals in said first recording area;
    ancillary audio signal recording means for recording, as ancillary audio signals, signals comprising at least two channels out of the cross-channel converted stereo audio signals in said second recording area;
    means for recording a signal related to said control signal together with at least one of said main audio signals and ancillary signals; and
    means for dubbing said main audio signals reproduced from at least said first recording area of the audio signal recording and playback apparatus of said first magnetic recording and playback apparatus to the first recording area of the audio signal recording and playback apparatus of a second magnetic recording and playback apparatus of said group;
    wherein said main audio signal recording means and said ancillary audio signal recording means, corresponding to said first and second recording areas respectively, are formed on each of skew tracks arranged in parallel on a magnetic tape, and
    wherein, further, said main audio signals and said ancillary audio signals are recorded on different areas, corresponding to said first and second recording areas respectively, on each of said skew tracks arranged in parallel on said magnetic tape.

15. An audio signal recording and playback apparatus of a magnetic recording and playback apparatus operative to record and play back, together with a video signal, audio signals in multiple channels in a first and second record areas different from each other in position formed on each of skew tracks arranged in parallel on a magnetic tape in correspondence to a first and second sets of audio signals each comprised of at least two channels, said magnetic recording and playback apparatus being operative in a group, wherein the audio signal recording and playback apparatus of a first magnetic recording and playback apparatus of the group comprises:
    audio signal input means for receiving stereo audio signals in at most four channels having attributes in said video signals and a control signal containing information on the channels of said received stereo audio signals;
    main audio signal recording means for generating, as main audio signals having attributes in said video signal, signals of at least two channels related to left audio information (L') and right audio information (R') included in signals of at most four channels derived through cross-channel converting said received stereo audio signals and for recording said generated main audio signals in said first recording area;
    ancillary audio signal recording means for recording, as ancillary audio signals, signals of remaining channels out of the cross-channel converted stereo audio signals in said second record area;
    means for recording a signal related to said control signal together with at least one of said main audio signals and ancillary audio signals;
    means for dubbing said main audio signals reproduced from at least said first record area of the audio signal recording and playback apparatus of said first magnetic recording and playback apparatus to the first record area of the audio signal recording and playback apparatus of a second magnetic recording and playback apparatus of said group;

wherein said main audio signal recording means and said ancillary audio signal recording means, corresponding to said first and second recording areas respectively, are formed on each of skew tracks arranged in parallel on a magnetic tape, and wherein, further, said main audio signals and said ancillary signals are recorded on different areas, corresponding to said first and second recording areas respectively, on each of said skew tracks arranged in parallel on said magnetic tape.

* * * * *